Aug. 4, 1964  A. J. FARMER  3,143,263
LIVE BAIT RECEPTACLE
Filed July 19, 1962
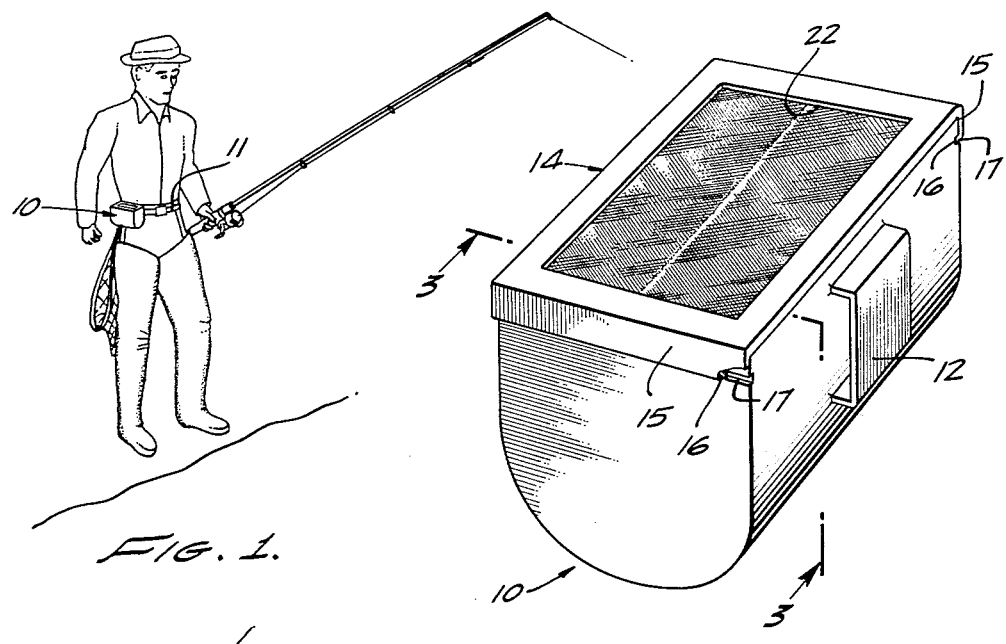
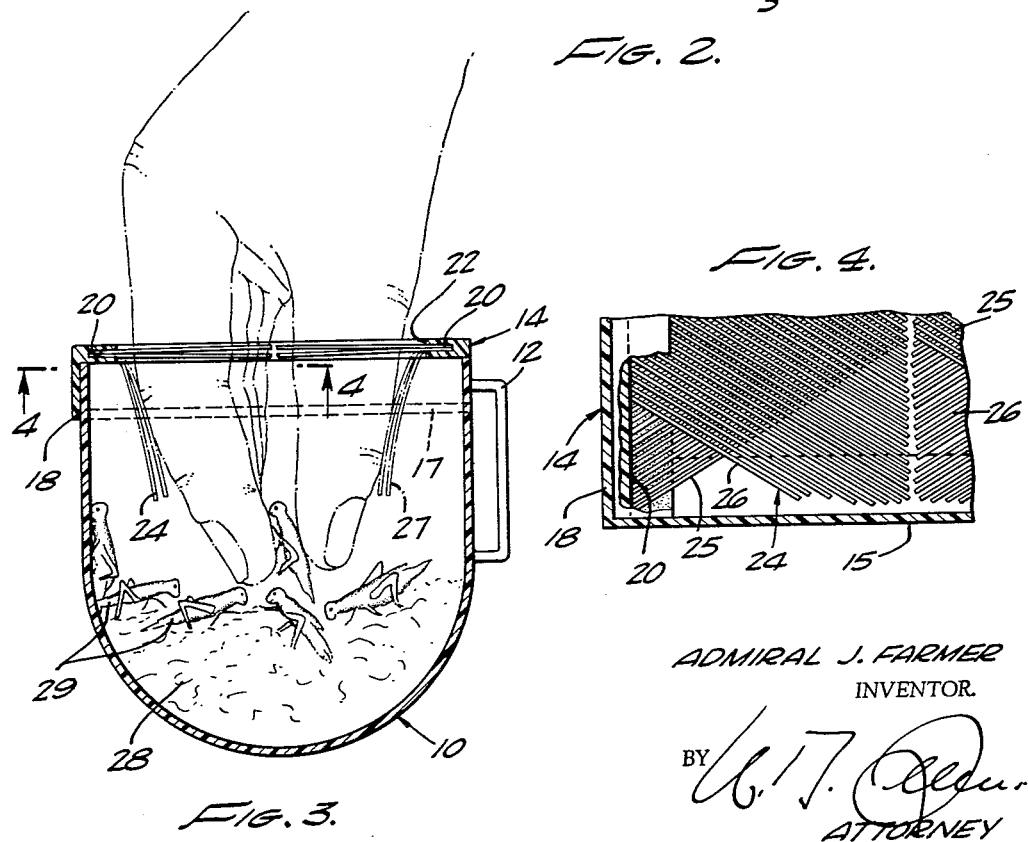
ADMIRAL J. FARMER
INVENTOR.

United States Patent Office 3,143,263
Patented Aug. 4, 1964

3,143,263
LIVE BAIT RECEPTACLE
Admiral J. Farmer, P.O. Box 313, Azusa, Calif.
Filed July 19, 1962, Ser. No. 210,978
4 Claims. (Cl. 224—5)

This invention relates to fishermen's bait receptacles and more particularly to an inexpensive lightweight receptacle particularly suitable for storing live bait and possessing special provisions facilitating the addition or withdrawal of live bait without risk of permitting other live bait from escaping.

Many sportsmen desiring to fish with live bait of the winged, jumping or fast-moving types are handicapped by the lack of a suitable receptacle for storing specimens of the bait while permitting addition or withdrawal of individual specimens without risk of other specimens escaping. Grasshoppers, crickets, June bugs and beetles of various types are but representative examples of live bait presenting particularly vexatious problems as respects safekeeping and withdrawal of bait while actually engaged in fishing.

With an understanding of the foregoing difficulties and disadvantages, there is provided by the present invention a highly satisfactory, inexpensive and highly effective bait receptacle. Typically, the invention bait receptacle comprises a thin-walled container having but a single opening preferably located in its upper portion. This opening is sufficiently large to permit the thumb and fingers to be thrust through and substantially to the bottom of the container. Normally the opening is effectively closed by a multiplicity of resilient filaments or fingers anchored at only one end and projecting across the opening in closely spaced relation. These are so arranged as to prevent the escape of the live bait but are readily thrust aside by the fingers with slight or no hindrance. Furthermore the filaments are sufficiently resilient and flexible as to remain in contact with the fingers and to cooperate therewith in preventing the escape of bait while a single specimen is being selected and withdrawn.

Accordingly it is a primary object of the present invention to provide an inexpensive highly efficient bait receptacle suitable for retaining specimens of live bait and having an access opening normally maintained closed by readily displaceable flexible closure means capable of resuming their original positions immediately and automatically as the fingers are withdrawn.

Another object of the invention is the provision of a sportsman's live bait receptacle adapted to be worn on the person and having an access opening at its upper portion maintained closed by a multiplicity of self-closing flexible filaments readily displaced by the fingers while inserting or removing bait.

These and other more specific objects will appear upon reading the following specification and claims and upon considering in connection therewith the attached drawings to which they relate.

Referring now to the drawings in which a preferred embodiment of the invention is illustrated.

FIGURE 1 is a perspective view showing a sportsman engaged in fishing and wearing a typical embodiment of the bait receptacle incorporating the present invention;

FIGURE 2 is an enlarged perspective view of the bait receptacle;

FIGURE 3 is a transverse vertical sectional view taken along line 3—3 on FIGURE 2 and showing a bait specimen about to be removed; and FIGURE 4 is a fragmentary sectional view on an enlarged scale taken along line 4—4 on FIGURE 3.

Referring to the drawings, there is shown one preferred embodiment of a live bait receptacle designated generally 10 suitably designed for support on the trouser belt 11 of a sportsman. The receptacle according to the present showing is generally U-shape in vertical section and is fully open across its top. This design enables the receptacle to be molded in one piece from any suitable plastic material and incorporates a mounting bracket 12 integral with one side wall. This bracket is of U-shape and open at its opposite ends to provide space for the insertion of the user's trouser belt. It will be appreciated that, if preferred, a spring clip of resilient plastic material or of metal may be embodied in the side wall of the receptacle and arranged to clip over the top edge of the belt, trouser rim or a side pocket of the person's clothing.

The wide area top access opening to the receptacle may be provided with a frame-like closure device 14 formed of metal or plastic and having downwardly projecting flanges 15, 15 at its ends having inturned lips 16. These lips are slidably engageable in outwardly opening grooves extending across opposed end walls of the receptacle. Desirably these grooves are so spaced with respect to the top edge of the receptacle that the under surface of the frame will frictionally engage the receptacle edge sufficiently to retain the frame normally closed without need for a fastener.

The outer longitudinal edge of frame 14 includes a downturned flange 18 normally abutting the forward side wall of the receptacle. This flange is integral with the ends of flanges 15 and serves to reinforce the frame very appreciably and also serves to hold side flanges 15, 15 seated in retaining grooves 17.

As is best shown in FIGURE 3, the opposite lateral edges of frame 14 are provided with narrow but deep grooves 20, 20 facing toward one another. These grooves serve as anchorages for multiplicity of resilient fingers or filaments employed to close the access opening 22 which opening is bordered by frame 14. Filaments 24 may be formed from various materials, as for example stiff horsehair, mohair, fine resilient wires, rayon, nylon or other resilient plastic filaments capable of withstanding repeated sharp deflection to the positions indicated in FIGURE 3 yet always returning to their normal original positions in the plane of grooves 20. This essential capability and characteristic of the filaments is greatly facilitated if they are arranged in at least two superimposed parallel layers 25, 26 (FIGURE 4) lying at an acute angle to one another. The filaments are firmly anchored by suitable adhesive potting compound or the like while inserted deeply within mounting grooves 20, 20 the other or opposite ends of the filaments being free and unsupported and terminating adjacent one another generally centrally of access opening 22.

It is also pointed out that the filaments may be mounted along a single edge only of the access opening with their free ends terminating close to the opposite edge. However, superior results are achieved by mounting the filaments cantilever fashion in the manner illustrated in FIGURE 2 with their free ends terminating immediately adjacent one another generally centrally of the access opening. It is also pointed out that greater supporting action and longer life may be achieved by using several layers of the filaments in the general manner illustrated but wherein the uppermost and the lowermost layers are of shorter length than the intermediate layers. It is particularly desirable to use a layer of shorter fingers or filaments on the innerside of frame 14.

In the use of the described bait box, the bottom is usually covered with loose litter or food 28 and then charged with specimens of live bait 29. If the filaments 25, 26 are of transparent plastic material, as is preferred, the user has little difficulty in viewing the specimens through the lattice work of filaments and is enabled to select a particular specimen with ease and certainty. To do so he merely thrusts the tips of his fingers while extended but closed toward the thumb centrally through the access opening in the manner indicated in FIGURE 3 and grasps a particular specimen. While the fingers are so disposed it will be noted that the deflected filaments lie snugly adjacent and enclose all exterior sides of the fingers while other filaments not contacted by the fingers remain closed across the access opening. As will be appreciated, this characteristic feature of the construction safeguards against escape of the live specimens without requiring any precautions or special manipulations of any kind on the part of the user. No skill or dexterity of any kind is required.

While the particular live bait receptacle herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A bait receptacle for live bait of the type used by fishermen adapted to be carried on the person, said receptacle having a hollow main body provided with a wide area access opening, self-closing flexible closure means for said opening including a multiplicity of closely positioned flexible resilient fingers supported at the edge of the opening and cooperating with one another to form a closure for the opening incapable of being opened by bait but readily displaced by the user's fingers when the finger tips are thrust through the opening, said resilient fingers normally lying in a predetermined position closing said opening but being readily deflectable both inwardly and outwardly away from said predetermined position by the user's fingers, and said resilient fingers being disposed in closely spaced layers with the fingers in one layer lying at an angle to those in the other layer whereby the fingers in one layer provide supporting action for a number of fingers in the other layer during deflection of the layers from their normal positions.

2. A live bait receptacle as defined in claim 1 characterized in that said fingers extend toward one another from opposed edges of said access opening with their free ends terminating close to one another intermediate said opposed edges.

3. A bait receptacle for use by fishermen in holding captive live bait until needed to bait a fish hook and comprising a receptacle closed except for a wide area access opening in the wall thereof, resilient self-closing closure means for said opening comprising a multiplicity of flexible resilient fingers closely spaced to one another and normally disposed in two adjacent rows crosswise of the opening with the remote ends of the fingers in said rows secured to the edges of said opening on the opposite sides thereof, the adjacent ends of said rows of fingers lying close to one another and cooperating to thwart the escape of live bait therepast, said rows of fingers being readily temporarily displaced by the user's fingers when thrust through the opening to grasp a bait specimen and closing to their normal positions automatically as the fingers are withdrawn through said opening, means on said receptacle for attaching the same to an item of clothing worn by the user, the fingers in each of said rows being arranged in criss-crossing layers, means for securing their remote ends together and for anchoring the latter ends to the edges of said access opening, the free ends of said fingers terminating adjacent one another generally along the center of said access opening and being deflectable by the user's fingers both into the interior of said receptacle and outwardly away therefrom while bait is being inserted into or withdrawn therefrom.

4. A bait receptacle as defined in claim 3 characterized in that said resilient fingers forming said self-closing flexible closure means are mounted on a frame member bordering said access opening, and means for holding said frame member releasably closed across said access opening.

References Cited in the file of this patent

UNITED STATES PATENTS

| 594,448 | Webber | Nov. 30, 1897 |
| 2,051,136 | Dormie | Aug. 18, 1936 |
| 2,578,172 | Burton | Dec. 11, 1951 |
| 2,787,080 | Wells | Apr. 2, 1957 |